United States Patent
Nakagawa et al.

(10) Patent No.: US 8,053,125 B2
(45) Date of Patent: Nov. 8, 2011

(54) FUEL CELL HAVING BUFFER AND SEAL FOR COOLANT

(75) Inventors: Takaki Nakagawa, Tochigi (JP); Takahiro Yoshida, Utsunomiya (JP); Hiroyuki Tanaka, Utsunomiya (JP); Takashi Kosaka, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1219 days.

(21) Appl. No.: 11/082,479

(22) Filed: Mar. 16, 2005

(65) Prior Publication Data
US 2005/0208364 A1    Sep. 22, 2005

(30) Foreign Application Priority Data
Mar. 16, 2004 (JP) ................. 2004-074173

(51) Int. Cl.
*H01M 2/14* (2006.01)
*H01M 2/00* (2006.01)
*H01M 2/02* (2006.01)
*H01M 2/08* (2006.01)
*H01M 8/00* (2006.01)
*H01M 8/10* (2006.01)

(52) U.S. Cl. ........ 429/434; 429/437; 429/457; 429/458; 429/460; 429/483

(58) Field of Classification Search ............ None
See application file for complete search history.

(56) References Cited

U.S. PATENT DOCUMENTS

| | | | | |
|---|---|---|---|---|
| 6,153,326 | A | * | 11/2000 | Matsukawa et al. ........... 429/34 |
| 2002/0102453 | A1 | * | 8/2002 | Suenaga et al. ................ 429/37 |
| 2003/0215692 | A1 | * | 11/2003 | Rock et al. ...................... 429/38 |
| 2004/0106028 | A1 | * | 6/2004 | Sugiura et al. ................ 429/26 |
| 2005/0048342 | A1 | * | 3/2005 | Wakahoi et al. ............... 429/30 |

FOREIGN PATENT DOCUMENTS

| | | |
|---|---|---|
| CA | 2300008 A1 * | 9/2000 |
| JP | 11-129396 | 5/1999 |
| JP | 2000-260439 | 9/2000 |
| JP | 2004-47495 | 2/2004 |

OTHER PUBLICATIONS

Definition of "Integral" retrieved from Dictionary.com on Nov. 18, 2009.*
Japanese Office Action for Application No. 2004-074173, dated Apr. 21, 2009.

* cited by examiner

*Primary Examiner* — Robert Hodge
(74) *Attorney, Agent, or Firm* — Nelson Mullins Riley & Scarborough LLP; Anthony A. Laurentano (57) ABSTRACT

A first seal member is formed integrally on both surfaces of a first metal plate. The first seal member is integrally formed on a cooling surface of the first metal plate, except a region corresponding to a reaction surface facing an electrode reaction surface, and except regions of inlet buffers and outlet buffers. The first seal member has an expansion. The position of an end surface of the expansion substantially matches the position of a wall surface of the outermost groove of a coolant flow field to prevent the flow of a coolant around the electrode reaction surface.

5 Claims, 7 Drawing Sheets

FUEL CELL HAVING BUFFER AND SEAL FOR COOLANT

BACKGROUND OF THE INVENTION

1. Field of the Invention

The present invention relates to a fuel cell formed by stacking an electrolyte electrode assembly between a pair of metal separators in a stacking direction. The electrolyte electrode assembly includes a pair of electrodes and an electrolyte interposed between the electrodes. A reactant gas supply passage, a reactant gas discharge passage, a coolant supply passage, and a coolant discharge passage extend through the fuel cell in the stacking direction. Further, a reactant gas flow field for supplying a reactant gas along a reaction surface of the electrode is formed between the metal separator and the electrolyte electrode. Further, a coolant flow field for supplying a coolant is formed between the metal separators.

2. Description of the Related Art

For example, a solid polymer fuel cell employs a polymer ion exchange membrane as a solid polymer electrolyte membrane. The solid polymer electrolyte membrane is interposed between an anode and a cathode to form a membrane electrode assembly. Each of the anode and the cathode is made of electrode catalyst and porous carbon. The membrane electrode assembly is sandwiched between separators (bipolar plates) to form the fuel cell. In use, generally, a predetermined number of the fuel cells are stacked together to form a fuel cell stack.

In the fuel cell, a fuel gas (reactant gas) such as a gas chiefly containing hydrogen (hereinafter also referred to as the hydrogen-containing gas) is supplied to the anode. An oxidizing gas (reactant gas) such as a gas chiefly containing oxygen (hereinafter also referred to as the oxygen-containing gas) is supplied to the cathode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode membrane, creating a DC electrical energy.

In the fuel cell, for example, a metal plate is used for fabricating the separator. The strength of the metal separator is high in comparison with a carbon separator, and the metal plate is suitable for fabricating a thin separator. Reactant gas flow fields having the desired shapes are formed on the metal separator by press forming in order to reduce the thickness of the metal separator, and to achieve reduction in the overall size and weight of the fuel cell.

Figure 7:
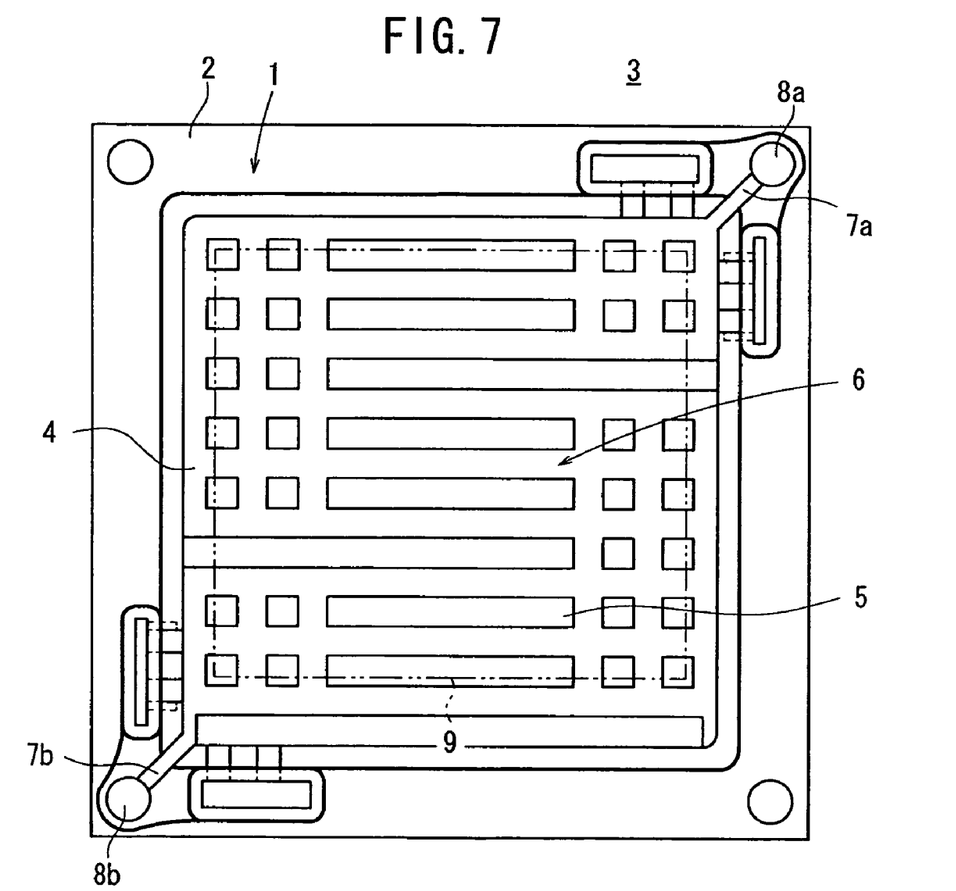
FIG. 7 is a view showing a separator of a fuel cell disclosed in Japanese Laid-Open Patent Publication No. 11-129396.

Seal members are formed integrally on the metal separator, and the metal is partially exposed on the cooling surface for controlling the temperature of the electrode reaction surface of the membrane electrode assembly facing the metal separator. For example, Japanese Laid-Open Patent Publication No. 11-129396 discloses a method of producing a fuel cell separator 3 as shown in FIG. 7. According to the disclosure, a seal member 2 is formed integrally on a metal separator body 1 by injection molding.

The fuel cell separator 3 has a cooling surface and a reaction surface opposite to the cooling surface. On the cooling surface, metal of the separator body 1 is exposed in a central region 4 of the fuel cell separator 3. A coolant flow field 6 is formed by corrugated patterns 5 in the central region 4. The coolant flow field 6 is connected to fluid passages 8a, 8b through channels 7a, 7b at diagonal positions. The reaction surface faces an electrode reaction surface 9 of an electrode (not shown).

In the conventional technique, the surface area of the exposed metal in the central region 4 of the separator body 1 is larger than the surface area of the electrode reaction surface 9. Therefore, temperature distribution in the electrode reaction surface 9 is large. Consequently, variation occurs in the power generation performance of the unit cells (fuel cells) of the fuel cell stack.

SUMMARY OF THE INVENTION

A main object of the present invention is to provide a fuel cell in which the surface area of exposed metal of a cooling surface is substantially equal to the surface area of an electrode reaction surface, and temperature distribution in the electrode reaction surface is reduced to achieve the desired power generation performance.

According to the present invention, a fuel cell is formed by stacking an electrolyte electrode assembly between a pair of metal separators in a stacking direction. The electrolyte electrode assembly includes a pair of electrodes and an electrolyte interposed between the electrodes.

A reactant gas passage and a coolant passage extend through the fuel cell in the stacking direction. Each of the metal separators has a reaction surface facing the electrolyte electrode assembly and a cooling surface opposite to the reaction surface. A reactant gas flow field is formed on the reaction surface of the metal separator for supplying a reactant gas along an electrode reaction surface of the electrolyte electrode assembly. A coolant flow field is formed between the metal separators, on the cooling surface for supplying a coolant along the metal separators.

A buffer connecting the coolant passage and the coolant flow field is formed on the cooling surface of each of the metal separators. A seal member is formed integrally on at least the cooling surface, except a region corresponding to the reaction surface facing the electrode reaction surface, and except a region of the buffer.

It is preferable that four buffers are provided at four corners of at least one of the metal separators. The buffers at the four corners are utilized to supply and discharge the reactant gas. Therefore, the reactant gas is uniformly supplied to the electrode reaction surface.

It is preferable that the buffer has a substantially triangle shape. That is, the buffer includes an oblique section, and the fluid passage is formed to have a shape corresponding to the buffer to achieve reduction of surface area required for the buffer and the fluid passage.

Further, it is preferable that the reactant gas passage includes a fuel gas supply passage, an oxygen-containing gas supply passage, a fuel gas discharge passage and an oxygen-containing gas discharge passage, and the coolant passage includes a coolant supply passage and a coolant discharge passage, and among six passages comprising the fuel gas supply passage, the oxygen-containing gas supply passage, the coolant supply passage, the fuel gas discharge passage, the oxygen-containing gas discharge passage, and the coolant discharge passage, it is preferable that three passages extend through left ends of the metal separators, and the other three passages extend through right ends of the metal separators.

That is, the fluid passages are only provided at opposite ends of the metal separators. Therefore, the height of the metal separator can be reduced effectively. Thus, the fuel cell is mounted suitably in a small space of a vehicle, such as the under floor space.

Further, it is preferable that the reactant gas flow field comprises a serpentine flow groove, and an end of a turn region of the serpentine flow groove and an end of the seal member around the coolant passage formed respectively on the reaction surface and on the cooling surface of the metal separator are substantially in alignment with each other.

According to the present invention, in the cooling surface of the metal separator, i.e., in the metal surface which is exposed to the outside, the surface area of the region which does not correspond to the electrode reaction surface, and the buffer is reduced as much as possible. Therefore, the coolant only flows through the region corresponding to the electrode reaction surface where exothermal reaction occurs, and the coolant does not flow around the electrode reaction surface. Thus, temperature distribution in the electrode reaction surface is reduced effectively. Accordingly, with the simple structure, variation in the power generation performance of the fuel cell is reduced, and the efficient and desired power generation is achieved reliably.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
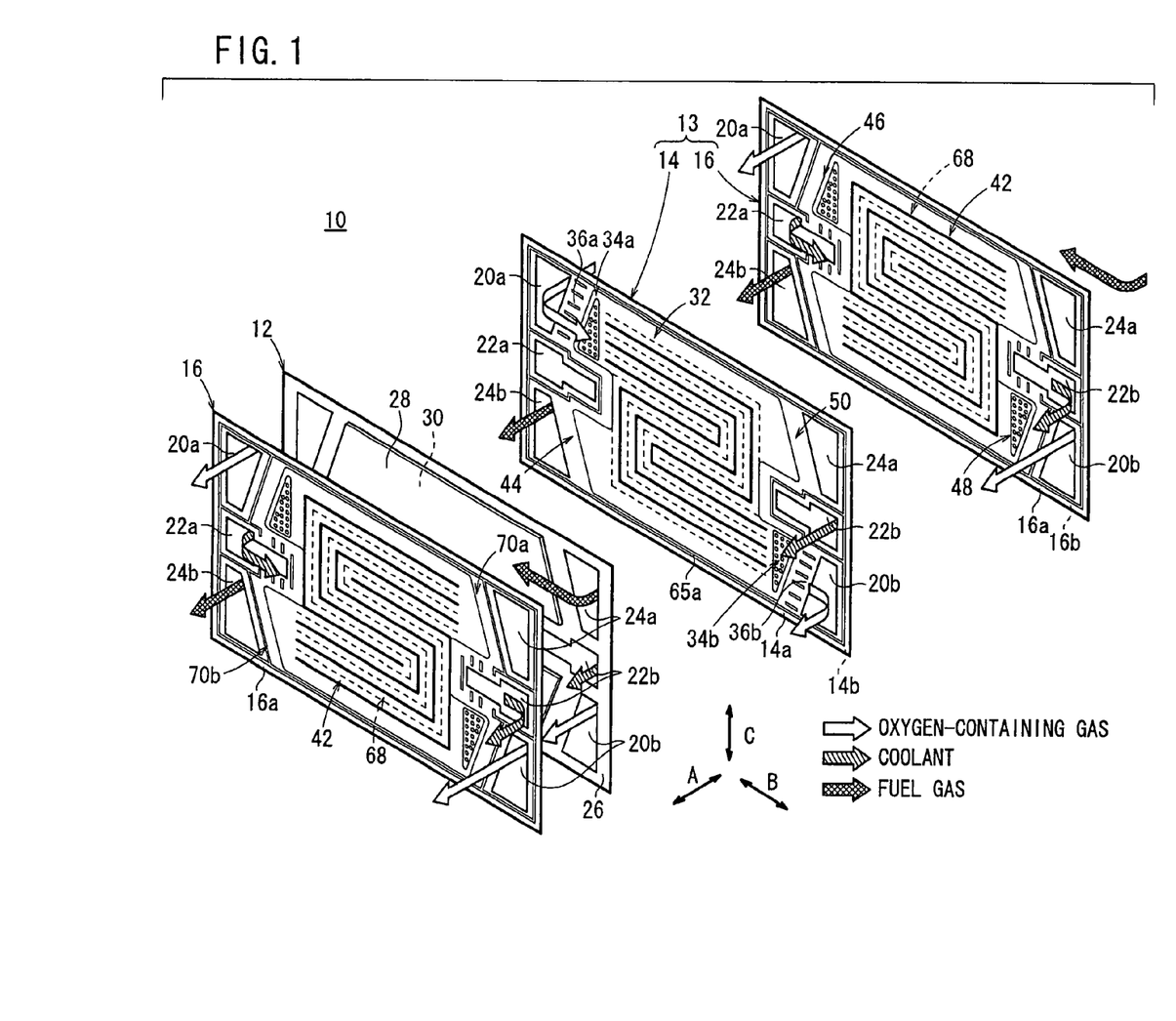
FIG. 1 is a perspective view schematically showing main components of a fuel cell according an embodiment of the present invention.

FIG. 1 is a perspective view schematically showing main components of a fuel cell 10 according an embodiment of the present invention.

The fuel cell 10 is formed by stacking a membrane electrode assembly (MEA) 12 and separators 13 alternately in a horizontal direction indicated by an arrow A. Each of the separators 13 includes first and second metal plates 14, 16, which are stacked together.

At one end of the fuel cell 10 in a direction indicated by an arrow B, an oxygen-containing gas supply passage (reactant gas passage) 20a for supplying an oxygen-containing gas, a coolant supply passage 22a for supplying a coolant, and a fuel gas discharge passage (reactant gas passage) 24b for discharging a fuel gas such as a hydrogen-containing gas are arranged vertically in a direction indicated by an arrow C. The oxygen-containing gas supply passage 20a, the coolant supply passage 22a, and the fuel gas discharge passage 24b extend through the fuel cell 10 in a stacking direction indicated by an arrow A.

At the other end of the fuel cell 10 in the direction indicated by the arrow B, a fuel gas supply passage (reactant gas passage) 24a for supplying the fuel gas, a coolant discharge passage 22b for discharging the coolant, and an oxygen-containing gas discharge passage (reactant gas passage) 20b for discharging the oxygen-containing gas are arranged vertically in the direction indicated by the arrow C. The fuel gas supply passage 24a, the coolant discharge passage 22b, and the oxygen-containing gas discharge passage 20b extend through the fuel cell 10 in the direction indicated by the arrow A.

The membrane electrode assembly 12 comprises an anode 28, a cathode 30, and a solid polymer electrolyte membrane 26 interposed between the anode 28 and the cathode 30. The solid polymer electrolyte membrane 26 is formed by impregnating a thin membrane of perfluorosulfonic acid with water, for example. At opposite ends of the anode 28 and the cathode 30 in the direction indicated by the arrow B, central portions of the anode 28 and the cathode 30 are cut away inwardly for providing the coolant supply passage 22a and the coolant discharge passage 22b.

Each of the anode 28 and cathode 30 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 28 and the electrode catalyst layer of the cathode 30 are fixed to both surfaces of the solid polymer electrolyte membrane 26, respectively.

Figure 2:
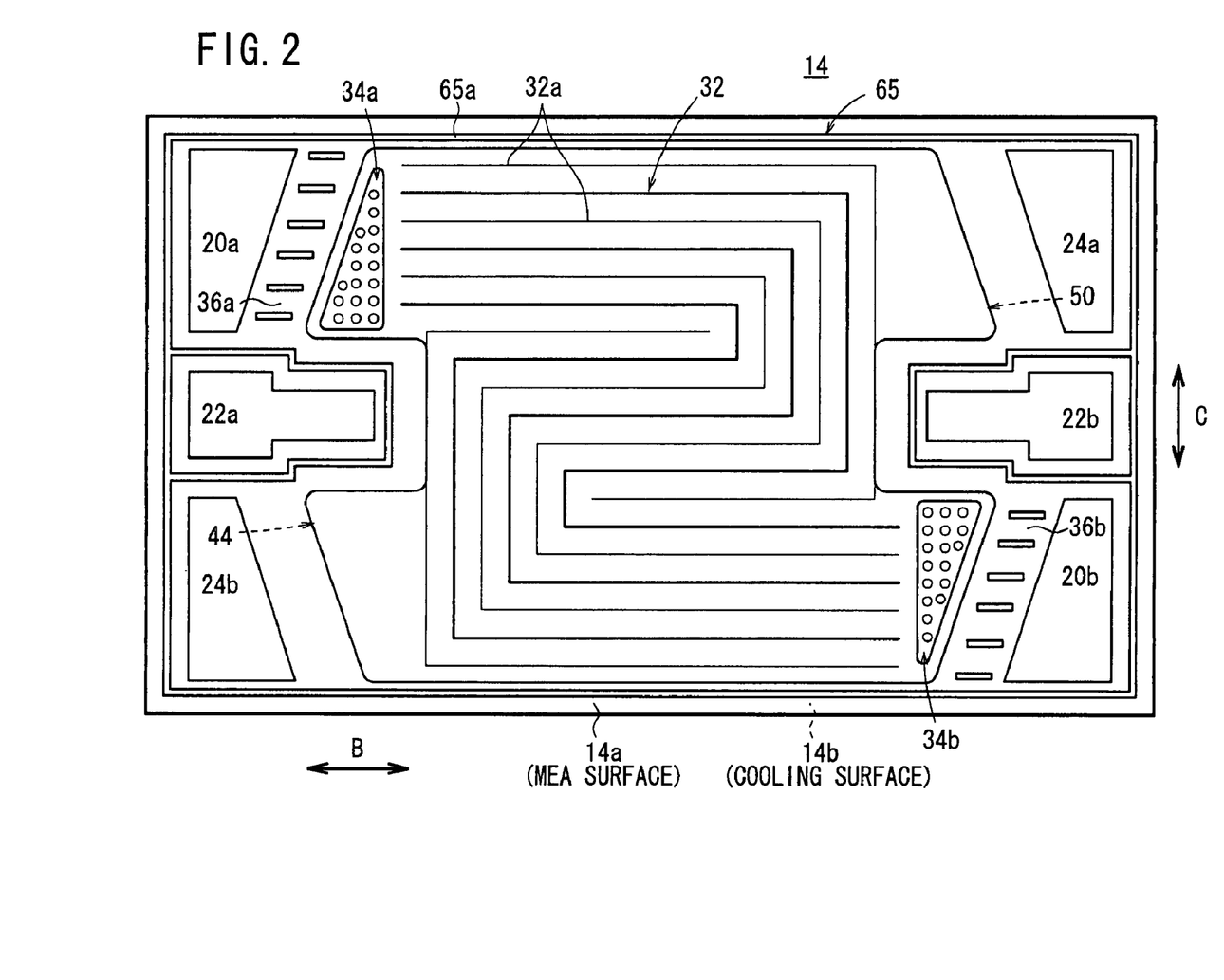
FIG. 2 is a view showing one surface of a first metal plate of the fuel cell.

As shown in FIGS. 1 and 2, the first metal plate 14 has an oxygen-containing gas flow field (reactant gas flow field) 32 on its surface (MEA surface) 14a facing the cathode 30 of the membrane electrode assembly 12. A substantially triangular inlet buffer 34a is provided near the oxygen-containing gas supply passage 20a, and a substantially inverted triangular outlet buffer 34b is provided near the oxygen-containing gas discharge passage 20b. The oxygen-containing gas flow field 32 is connected to the inlet buffer 34a and the outlet buffer 34b.

For example, the inlet buffer 34a and the outlet buffer 34b include a plurality of bosses or dimples, respectively. The inlet buffer 34a is connected to the oxygen-containing gas supply passage 20a, and the outlet buffer 34b is connected to the oxygen-containing gas discharge passage 20b. That is, the oxygen-containing gas flow field 32 is connected to the oxygen-containing gas supply passage 20a through the inlet buffer 34a, and connected to the oxygen-containing gas discharge passage 20b through the outlet buffer 34b. Specifically, the oxygen-containing gas supply passage 20a is connected to the inlet buffer 34a through connection grooves 36a, and the oxygen-containing gas discharge passage 20b is connected to the outlet buffer 34b through connection grooves 36b. The inlet buffer 34a and the outlet buffer 34b are connected to oxygen-containing gas flow grooves 32a of the oxygen-containing gas flow field 32. The oxygen-containing gas flow grooves 32a extend in parallel with each other in a serpentine pattern for allowing the oxygen-containing gas to flow back and forth in the direction indicated by the arrow B, and flow in the direction indicated by the arrow C. The oxygen-containing gas flow grooves 32a have two turn regions, and three straight regions extending in the direction indicated by the arrow B, for example.

Figure 3:
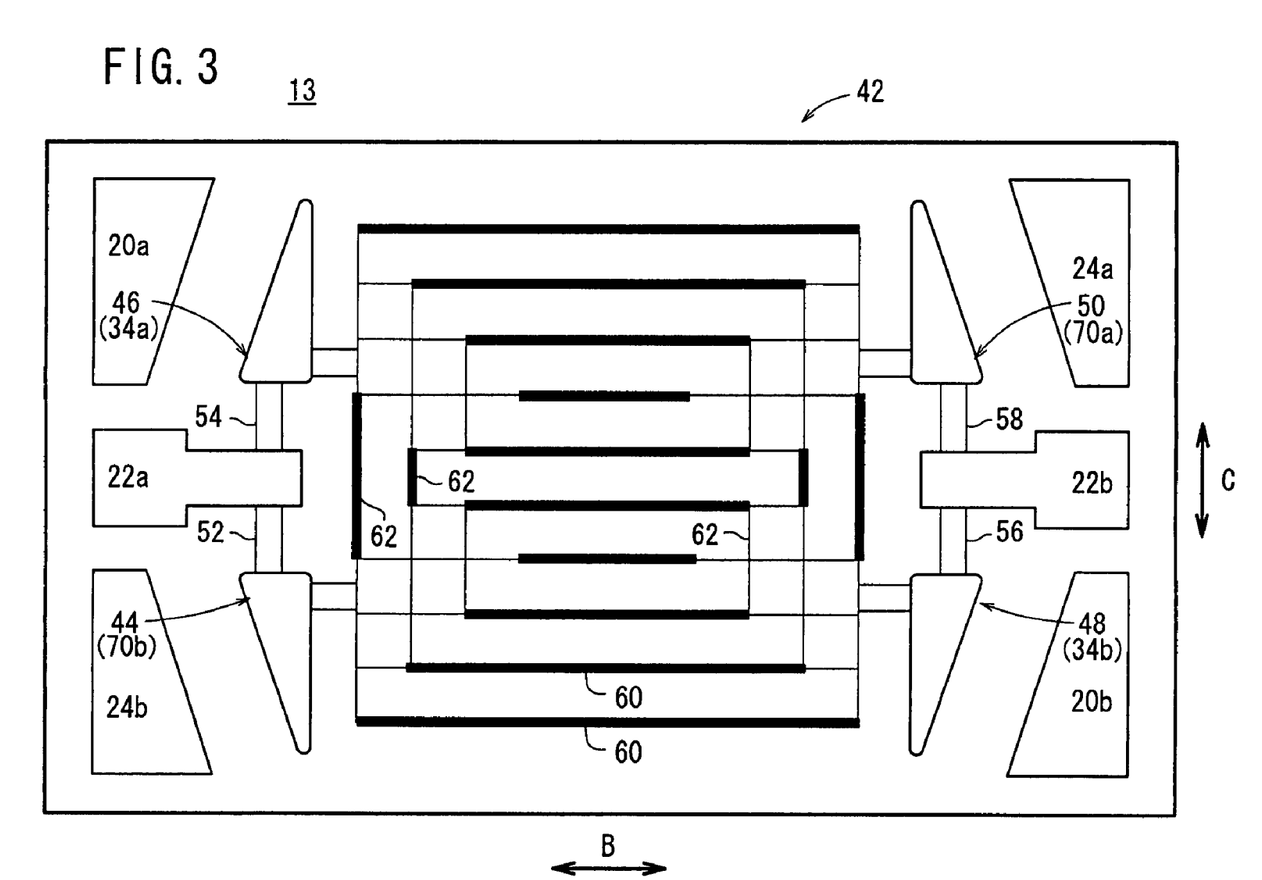
FIG. 3 is a front view showing a coolant flow field of the fuel cell.

A surface 14b of the first metal plate 14 faces a surface 16a of the second metal plate 16, and a coolant flow field 42 is formed between the surface 14b of the first metal plate 14 and the surface 16a of the second metal plate 16. As shown in FIG. 3, for example, two inlet buffers 44, 46 and two outlet buffers 48, 50 are provided in the coolant flow field 42. The inlet buffers 44, 46 are provided at opposite sides of the coolant supply passage 22a in the direction indicated by the arrow C, and the outlet buffers 48, 50 are provided at opposite sides of the coolant discharge passage 22b in the direction indicated by the arrow C.

The coolant supply passage 22a is connected to the inlet buffer 44 through inlet connection grooves 52, and connected to the inlet buffer 46 through inlet connection grooves 54. The coolant discharge passage 22b is connected to the outlet buffer 48 through outlet connection grooves 56, and connected to the outlet buffer 50 through outlet connection grooves 58.

The coolant flow field 42 comprises a plurality of straight flow grooves 60 extending in the direction indicted by the arrow B, and a plurality of straight flow grooves 62 extending in the direction indicated by the arrow C. The straight flow grooves 60 are arranged at predetermined intervals in the direction indicated by the arrow C. The straight flow grooves 62 are provided at opposite ends of the strait flow grooves 60 in the direction indicated by the arrow B, and arranged at predetermined intervals in the direction indicated by the arrow B. The coolant flow field 42 is partially defined by grooves on the surface 14b of the first metal plate 14, and partially defined by grooves on the surface 16a of the second metal plate 16. The coolant flow field 42 is formed between the first metal plate 14 and the second metal plate 16 when the first metal plate 14 and the second metal plate 16 are stacked together.

Figure 4:
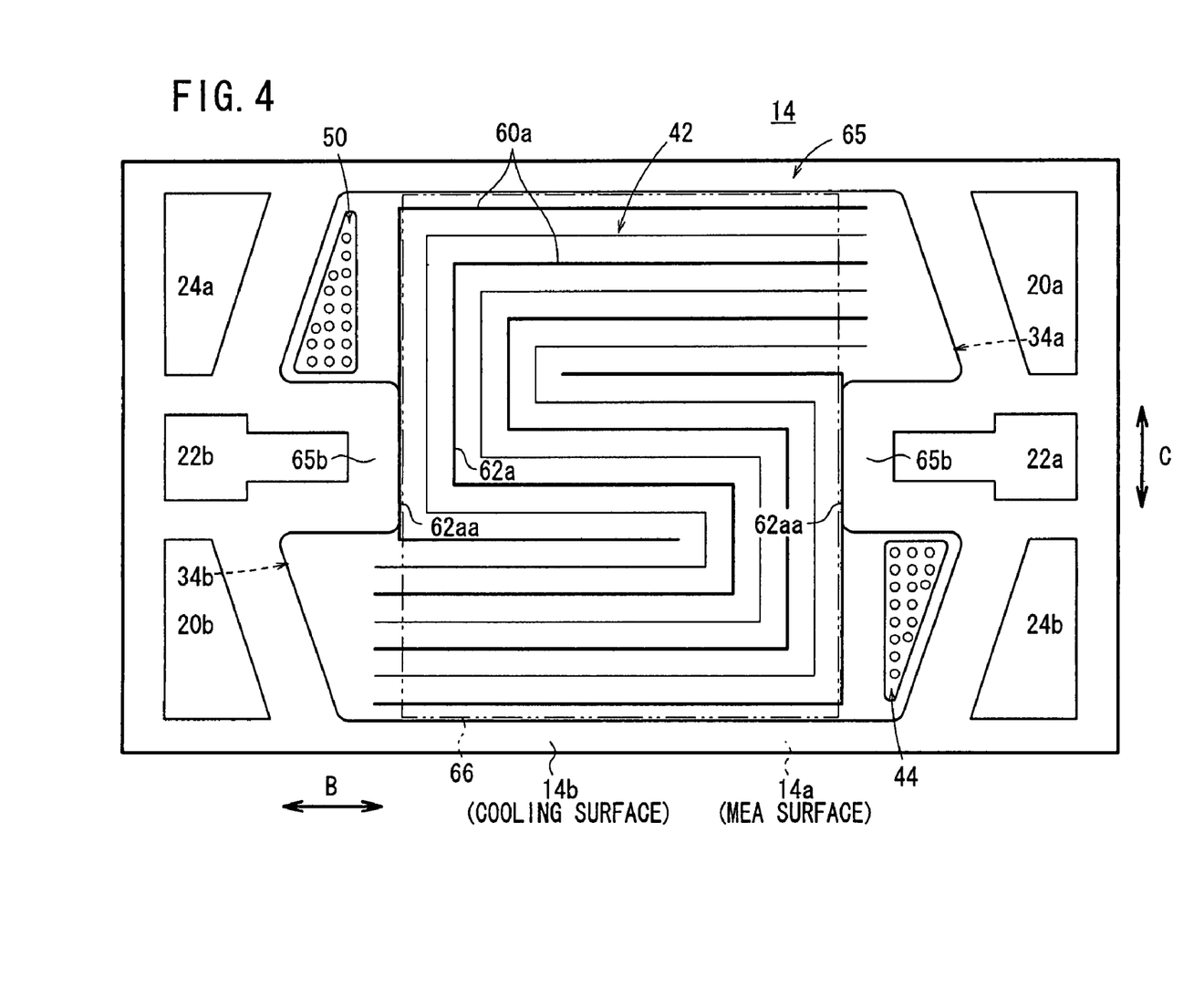
FIG. 4 is a view showing the other surface of the first metal plate.

As shown in FIG. 4, the grooves of the coolant flow field 42 are partially formed on the surface (cooling surface) 14b of the first metal plate 14. Protrusions on the surface 14b formed by the oxygen-containing gas flow grooves 32a of the oxygen-containing gas flow field 32 on the surface 14a are not shown for ease of understanding. Likewise, in FIG. 5, protrusions on the surface 16a formed by fuel gas flow grooves 68a (described later) of a fuel gas flow field 68 on the surface 16b are not shown.

The inlet buffer 44 connected to the coolant supply passage 22a, and the outlet buffer 50 connected to the coolant discharge passage 22b are provided on the surface 14b. Further, on the surface 14b, grooves 60a, 62a as part of the straight flow grooves 60, 62 extend in the direction indicated by the arrow B and the direction indicated by the arrow C for predetermined distances.

A first seal member 65 is formed integrally on the surfaces 14a, 14b of the first metal plate 14 by injection molding to cover (sandwich) the outer edge of the first metal plate 14. The first seal member 65 is a planar seal including a line seal 65a as shown in FIG. 2. The line seal 65a is formed around the oxygen-containing gas supply passage 20a, the oxygen-containing gas discharge passage 20b, and the oxygen-containing gas flow field 32 for preventing leakage of the oxygen-containing gas. The line seal 65a includes divider walls of the connection grooves 36a, 36b.

As shown in FIG. 4, the first seal member 65 is formed integrally on the surface 14b except a region where the corresponding region on the opposite (back) surface 14a faces an electrode reaction surface 66 of the cathode 30, and except regions of the inlet buffers 34a, 44 and the outlet buffers 34b, 50.

Specifically, the serpentine oxygen-containing gas flow grooves 32a of the oxygen-containing gas flow field 32 on the surface 14a form the serpentine flow grooves 60a, 62a of the coolant flow field 42 on the surface 14b. On the surface 14b, the first seal member 65 includes expansions 65b expanding inwardly toward the coolant flow field 42. The outermost grooves 62aa as part of the serpentine flow grooves 62a of the coolant flow field 42 are positioned at opposite ends of the region corresponding to the region of the electrode reaction surface 66 in the direction indicated by the arrow B. At each opposite end, the position of the wall of the outermost groove 62aa substantially matches the position of the end surface of the expansion 65b.

The expansions 65b are provided at positions corresponding to the positions of the turn regions of the oxygen-containing gas flow field 32 on the surface 14a. At each opposite end, the end surface (wall) of the turn region of the oxygen-containing gas flow field 32 on the surface 14a and the end surface of the expansion 65b on the surface 14b are substantially in alignment with each other, i.e., substantially at the same position, and no space is present between these end surfaces.

Figure 5:
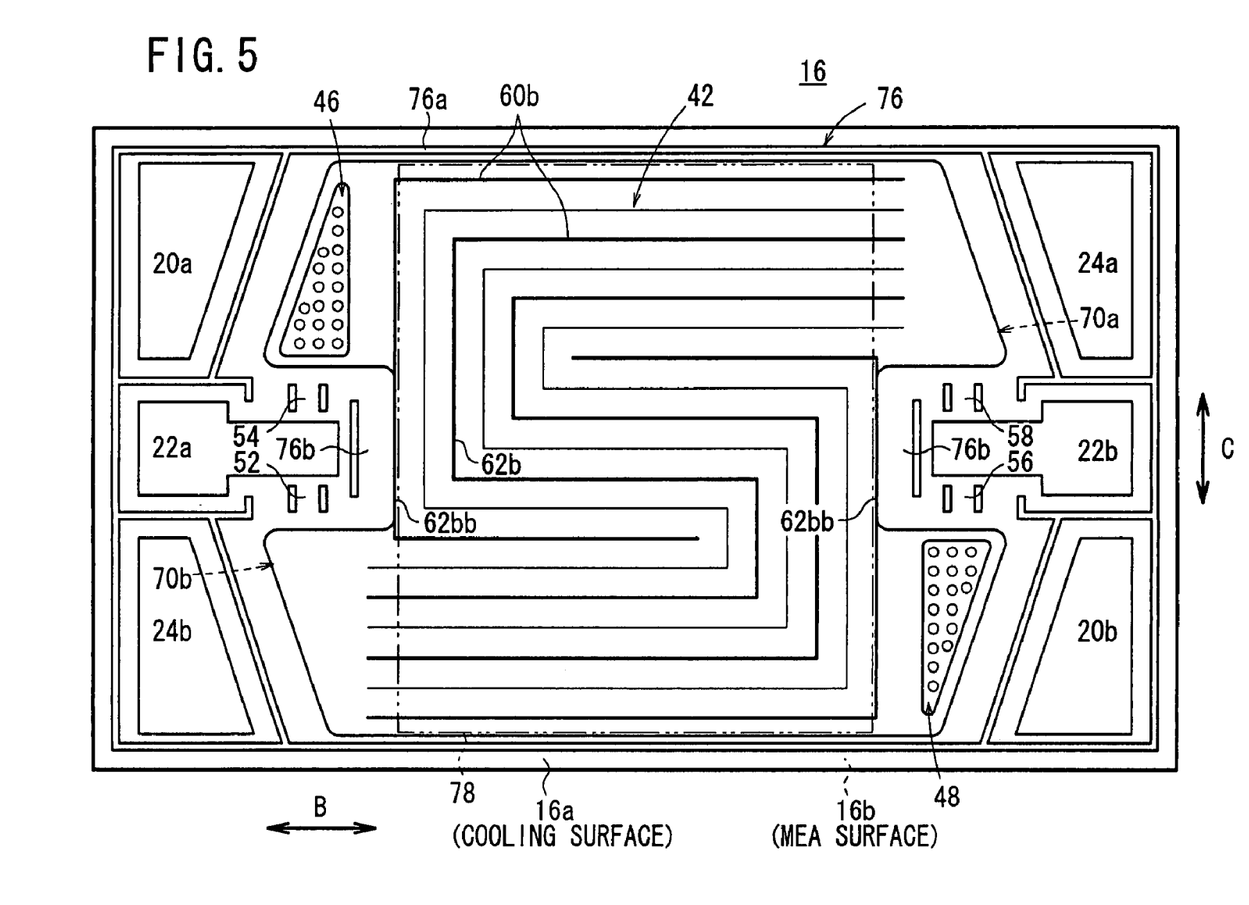
FIG. 5 is a view showing one surface of a second metal plate of the fuel cell.

As shown in FIG. 5, the inlet buffer 46 and the outlet buffer 48 are formed on the surface (cooling surface) 16a of the second metal plate 16. Further, on the surface 16a, grooves 60b, 62b as part of the straight flow grooves 60, 62 extend in the direction indicated by the arrow B and the direction indicated by the arrow C for predetermined distances. In the coolant flow field 42, at part of the straight flow grooves 60 extending in the direction indicated by the arrow B, the grooves 60a and the grooves 60b face each other to form a main flow field. The sectional area of the main flow field in the coolant flow field 42 is twice as large as the sectional area of the other part of the coolant flow field 42 (see FIG. 3).

Figure 6:
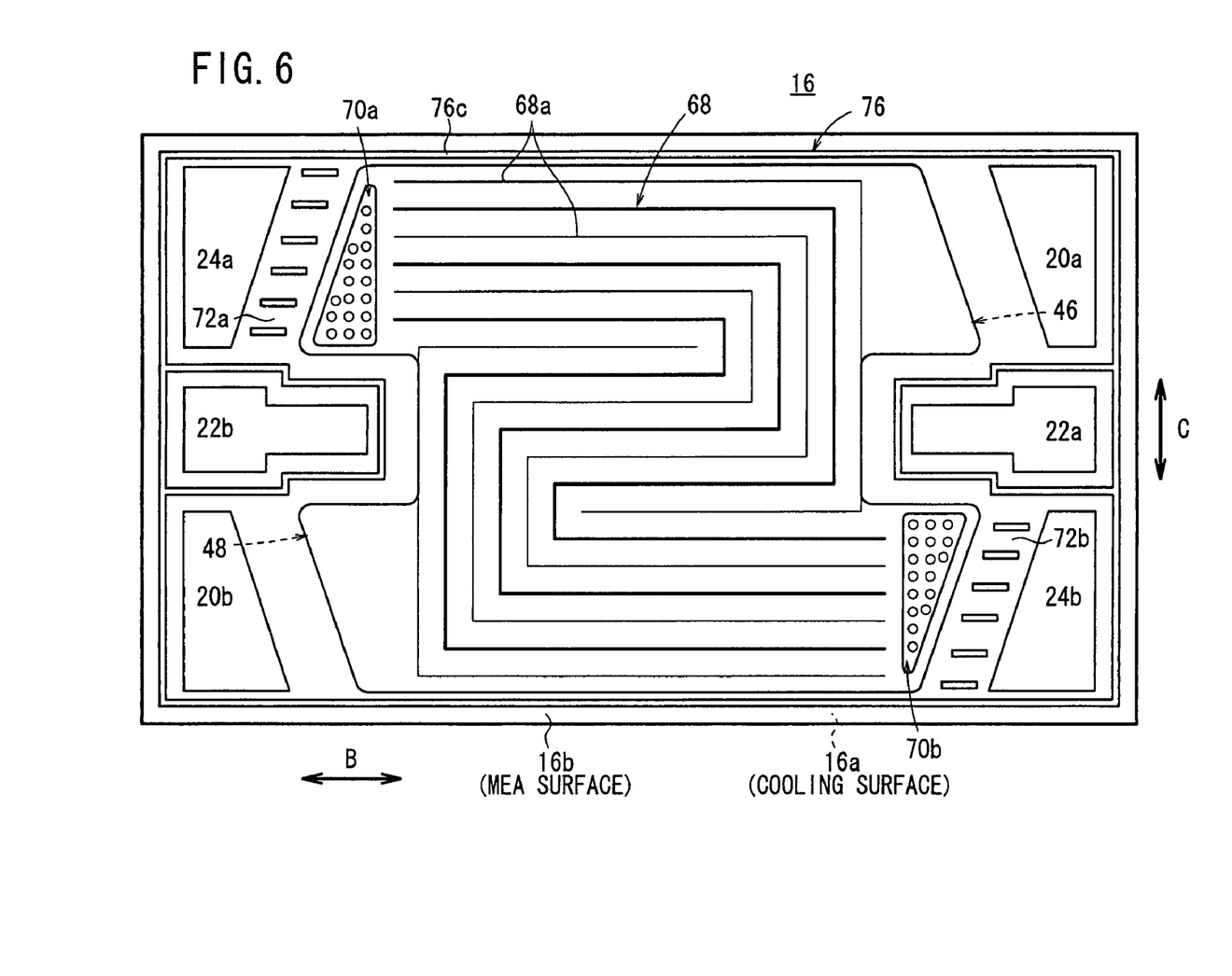
FIG. 6 is a view showing the other surface of the second metal plate.

As shown in FIG. 6, the second metal plate 16 has the fuel gas flow field 68 on its surface (MEA surface) 16b facing the membrane electrode assembly 12. A substantially triangular inlet buffer 70a is provided near the fuel gas supply passage 24a, and a substantially inverted triangular outlet buffer 70b is provided near the fuel gas discharge passage 24b. The fuel gas flow field 68 is connected to the inlet buffer 70a and the outlet buffer 70b.

The fuel gas supply passage 24a is connected to the inlet buffer 70a through a plurality of connection grooves 72a, and the fuel gas discharge passage 24b is connected to the outlet buffer 70b through a plurality of connection grooves 72b. The fuel gas flow grooves 68a of the fuel gas flow field 68 extend in parallel with each other in a serpentine pattern for allowing the fuel gas to flow back and forth in the direction indicated by the arrow B, and flow in the direction indicated by the arrow C. The fuel gas flow grooves 68a have two turn regions, and three straight regions extending in the direction indicated by the arrow B, for example.

A second seal member 76 is formed integrally on the surfaces 16a, 16b of the second metal plate 16 by injection molding to cover (sandwich) the outer edge of the second metal plate 16. The second seal member 76 is a planar seal including a line seal 76a and a line seal 76c. On the surface 16a, as shown in FIG. 5, the line seal 76a is formed around the coolant supply passage 22a, the coolant discharge passage 22b, and the coolant flow field 42 for preventing leakage of the coolant.

The second seal member 76 is formed integrally on the surface 16a except a region where the corresponding region on the surface 16b faces an electrode reaction surface 78 of the anode 28, and except regions of the inlet buffers 46, 70a and the outlet buffers 48, 70b. The second seal member 76 includes expansions 76b on the surface 16a. The expansions 76b are provided at positions corresponding to the positions of the turn regions of the fuel gas flow field 68 on surface 16b. At each end in the direction indicated by the arrow B, the end surface of the turn region of the fuel gas flow field 68 on the surface 16b and the end surface of the expansion 76b on the surface 16a are in alignment with each other, i.e., substantially at the same position. Further, on the surface 16a, at each end in the direction indicated by the arrow B, the position of the wall of the outermost serpentine groove 62bb substantially matches the position of the end surface of the expansion 76b.

On the surface 16b, as shown in FIG. 6, the line seal 76c is formed around the fuel gas supply passage 24a, the fuel gas discharge passage 24b, and the fuel gas flow field 68 for preventing leakage of the fuel gas. The line seal 76a includes divider walls of the inlet connection grooves 52, 54 and the outlet connection grooves 56, 58 (see FIG. 5). The line seal 76c includes divider walls of the connection grooves 72a, 72b (see FIG. 6).

When the first and second metal plates 14, 16 are stacked together, the inlet buffer 44 and the outlet buffer 50 of the first metal plate 14 are overlapped with the outlet buffer 70b and the inlet buffer 70a of the second metal plate 16 in the stacking direction, and the inlet buffer 34a and the outlet buffer 34b of the first metal plate 14 are overlapped with the inlet buffer 46 and the outlet buffer 48 of the second metal plate 16 in the stacking direction.

Next, operation of the fuel cell 10 will be described.

As shown in FIG. 1, an oxygen-containing gas is supplied to the oxygen-containing gas supply passage 20a, a fuel gas such as a hydrogen-containing gas is supplied to the fuel gas supply passage 24a, and a coolant such as pure water, an ethylene glycol or an oil is supplied to the coolant supply passage 22a.

The oxygen-containing gas flows from the oxygen-containing gas supply passage 20a into the oxygen-containing gas flow field 32 of the first metal plate 14. As shown in FIG. 2, the oxygen-containing gas flows through the inlet buffer 34a temporarily, and is distributed into the oxygen-containing gas flow grooves 32a of the oxygen-containing gas flow field 32. The oxygen-containing gas flows through the oxygen-containing gas flow grooves 32a in a serpentine pattern along the cathode 30 of the membrane electrode assembly 12 to induce a chemical reaction at the cathode 30.

The fuel gas flows from the fuel gas supply passage 24a into the fuel gas flow field 68 of the second metal plate 16. As shown in FIG. 6, the fuel gas flows through the inlet buffer 70a temporarily, and is distributed into the fuel gas flow grooves 68a of the fuel gas flow field 68. The fuel gas flows through the fuel gas flow grooves 68a in a serpentine pattern along the anode 28 of the membrane electrode assembly 12 to induce a chemical reaction at the anode 28.

Thus, in the membrane electrode assembly 12, the oxygen-containing gas supplied to the cathode 30, and the fuel gas supplied to the anode 28 are consumed in the electrochemical reactions at catalyst layers of the cathode 30 and the anode 28 for generating electricity.

After the oxygen-containing gas is consumed at the cathode 30, the oxygen-containing gas flows into the oxygen-containing gas discharge passage 20b through the outlet buffer 34b (see FIG. 2). Likewise, after the fuel gas is consumed at the anode 28, the fuel gas flows into the fuel gas discharge passage 24b through the outlet buffer 70b (see FIG. 6).

The coolant supplied to the coolant supply passages 22a flows into the coolant flow field 42 between the first and second metal plates 14, 16. As shown in FIG. 3, the coolant from the coolant supply passage 22a flows through the inlet connection grooves 52, 54 in the direction indicated by the arrow C, and flows into the inlet buffers 44, 46 temporarily.

The coolant is distributed from the inlet buffers 44, 46 into the straight flow grooves 60, 62, and flows horizontally in the direction indicated by the arrow B and vertically in the direction indicated by the arrow C. Thus, the coolant is supplied to the entire power generation surface of the membrane electrode assembly 12. Then, the coolant flows through the outlet buffers 48, 50 temporarily, and flows into the coolant discharge passages 22b through the outlet connection grooves 56, 58.

In the embodiment of the present invention, as shown in FIG. 4, the first seal member 65 is formed integrally on the surface 14b, except a region where the corresponding region of the opposite surface (back surface) 14a faces the electrode reaction surface 66 of the cathode 30, and except regions of the inlet buffers 34a, 44 and the outlet buffers 34b, 50. Therefore, the coolant flows into the coolant flow field 42 through the inlet buffers 44, 46, and flows out of the coolant flow field 42 through the outlet buffers 48, 50.

In particular, the expansions 65b of the first seal member 65 are formed at positions corresponding to the positions of the turn regions of the oxygen-containing gas flow field 32. The position of the end surface of the turn region substantially matches the position of the end surface of the expansion 65b. Therefore, in the cooling surface of the first metal plate 14, i.e., in the metal surface which is exposed to the outside, the surface area of the region which does not correspond to the electrode reaction surface 66, the inlet buffers 34a, 44, and the outlet buffers 34b, 50 is reduced as much as possible by providing the expansions 65b of the first seal member 65.

Therefore, it is possible to prevent the coolant from flowing around the electrode reaction surface 66 of the cathode 30. Thus, the temperature distribution in the electrode reaction surface 66 is reduced effectively. Accordingly, with the simple and economical structure, variation in the power generation performance of the fuel cell 10 is reduced, and the efficient and desired power generation is achieved reliably.

Also in the second metal plate 16, the expansions 76b of the second seal member 76 are provided at positions corresponding to the positions of the turn regions of the fuel gas flow field 68. Thus, the coolant does not flow around the electrode reaction surface 78 of the anode 28. Accordingly, the same advantages as with the first metal plate 14 can be obtained.

While the invention has been particularly shown and described with reference to a preferred embodiment, it will be understood that variations and modifications can be effected thereto by those skilled in the art without departing from the spirit and scope of the invention as defined by the appended claims.

What is claimed is:

1. A fuel cell comprising:
an electrolyte electrode assembly stacked between a pair of metal separators in a stacking direction, said electrolyte electrode assembly including a pair of electrodes and an electrolyte interposed between said electrodes;
a reactant gas passage and a coolant passage extending through said metal separators in the stacking direction;
a reaction surface provided on each of said metal separators facing said electrolyte electrode assembly;
a cooling surface provided on each of said metal separators opposite to said reaction surface;
a reactant gas flow field provided on said reaction surface of said metal separator for supplying a reactant gas along an electrode reaction surface of said electrolyte electrode assembly, the reaction surface including reactant buffers connecting the reactant gas passage to the reactant gas flow field on the reaction surface;
a coolant flow field provided between said metal separators on said cooling surface for supplying a coolant along said metal separators;
a buffer connecting said coolant passage and said coolant flow field, the buffer provided on said cooling surface of said metal separator; and a seal member disposed integrally on at least said cooling surface to cover all portions of said cooling surface except a region corresponding to said reaction surface facing said electrode reaction surface and except a region of said buffer connecting said coolant passage and said coolant flow field and a region corresponding to the reactant buffers on the reaction surface, the coolant flowing on the cooling surface only through a region where the seal member is not disposed, the seal member including expansion regions located immediately adjacent to sides of the coolant flow field and between the coolant flow field and the coolant passage.

2. A fuel cell according to claim 1, wherein said buffer comprises four buffers provided at four corners of at least one of said metal separators.

3. A fuel cell according to claim 1, wherein said buffer has a substantially triangular shape.

4. A fuel cell according to claim 1, wherein said reactant gas passage includes a fuel gas supply passage, an oxygen-containing gas supply passage, a fuel gas discharge passage and an oxygen-containing gas discharge passage, and said coolant passage includes a coolant supply passage and a coolant discharge passage; and among six passages comprising said fuel gas supply passage, said oxygen-containing gas supply passage, said coolant supply passage, said fuel gas discharge passage, said oxygen-containing gas discharge passage, and said coolant discharge passage, three passages extend through left ends of said metal separators, and the other three passages extend through right ends of said metal separators.

5. A fuel cell according to claim 1, wherein said reactant gas flow field comprises a serpentine flow groove; and an end of a turn region of said serpentine flow groove and an end of said seal member around said coolant passage formed respectively on said reaction surface and on said cooling surface of said metal separator are substantially in alignment with each other.

* * * * *